(12) United States Patent
Kim

(10) Patent No.: US 12,216,937 B2
(45) Date of Patent: Feb. 4, 2025

(54) STORAGE DEVICE, CONTROLLER AND CONTROLLER OPERATION METHOD WITH IMPROVED PROGRAM OPERATION EFFICIENCY

(71) Applicant: SK hynix Inc., Icheon (KR)

(72) Inventor: Jung Woo Kim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/325,722

(22) Filed: May 30, 2023

(65) Prior Publication Data
US 2024/0241668 A1    Jul. 18, 2024

(30) Foreign Application Priority Data

Jan. 12, 2023   (KR) .......................... 10-2023-0004465

(51) Int. Cl.
*G06F 3/06*     (2006.01)
*G06F 12/02*    (2006.01)

(52) U.S. Cl.
CPC .......... *G06F 3/0659* (2013.01); *G06F 3/0604* (2013.01); *G06F 3/0608* (2013.01); *G06F 3/0679* (2013.01); *G06F 12/0246* (2013.01); *G06F 2212/7207* (2013.01)

(58) Field of Classification Search
None
See application file for complete search history.

(56) References Cited

U.S. PATENT DOCUMENTS

| 10,296,243 | B2 * | 5/2019 | Kim ........................ G06F 3/065 |
| 11,966,589 | B2 * | 4/2024 | Han ....................... G06F 3/0655 |
| 2010/0306444 | A1 * | 12/2010 | Shirley ............... G06F 12/0802 711/6 |
| 2011/0055454 | A1 * | 3/2011 | Byom ................. G06F 12/0246 711/E12.008 |
| 2014/0189217 | A1 * | 7/2014 | Marukame .......... G06F 12/0246 711/103 |
| 2016/0378818 | A1 * | 12/2016 | Marcotte ............. G06F 11/1435 707/703 |
| 2017/0147246 | A1 * | 5/2017 | Byun ..................... G06F 3/061 |

FOREIGN PATENT DOCUMENTS

| KR | 1020180113230 A | 10/2018 |
| KR | 1020220046308 A | 4/2022 |

OTHER PUBLICATIONS

Dósa et al. "Tight absolute bound for First Fit Decreasing bin-packing: FFD(L) ≤ 11/9 OPT(L) + 6/9." 2013. Elsevier. Theoretical Computer Science. pp. 13-61.*

* cited by examiner

*Primary Examiner* — Nathan Sadler

(57) ABSTRACT

When a program operation to a second memory of user data in a first memory is to be performed and the size of user data is smaller than a unit program size of the second memory, final data having a size equal to the unit program size may be produced by concatenating the user data and meta data, and the final data may then programmed into the second memory. The second memory may be non-volatile memory, and the meta data may be meta data for the second memory. In some cases, dummy data may also be concatenated with the user data and meta data to produce the final data. Accordingly, it is possible to perform the program operation according to the unit program size and improve the program operation efficiency by reducing the number of program operations performed to store meta data.

20 Claims, 9 Drawing Sheets

STORAGE DEVICE, CONTROLLER AND CONTROLLER OPERATION METHOD WITH IMPROVED PROGRAM OPERATION EFFICIENCY

CROSS-REFERENCE TO RELATED APPLICATION

The present application claims priority under 35 U.S.C. 119(a) to Korean patent application number 10-2023-0004465 filed on Jan. 12, 2023, which is incorporated herein by reference in its entirety.

TECHNICAL FIELD

The embodiments of the present disclosure relate to a storage device, controller and controller operation method with improved program operation efficiency.

BACKGROUND

A storage device may include a memory including a plurality of memory cells and storing data. In addition, the storage device may include a controller for controlling an operation of storing or deleting data in a memory.

For example, the controller may receive a command from an external device, store (program) data in a memory according to the received command, or control an operation of reading or deleting data stored in the memory.

The controller may receive, when performing an operation of storing data in a memory, data to be stored in the memory and a command from an external device. The size of data to be stored in the memory may vary, and if the controller performs an operation of storing data in the memory whenever data is received, there may be deteriorated the operational efficiency of the controller and the memory.

SUMMARY

Embodiments of the disclosure may provide a configuration capable of improving the efficiency of the operation of the controller to program data in the memory and efficiently managing the data stored in the memory.

In one aspect, embodiments of the disclosure may provide a storage device including a non-volatile memory, a volatile memory storing at least one user data to be programmed into the non-volatile memory, and a controller configured to, if an execution command is input in a state where a size of the at least one user data stored in the volatile memory is smaller than a unit program size, control an operation of programming final data obtained by adding at least one of a plurality of meta data to the at least one user data into the non-volatile memory.

In another aspect, embodiments of the disclosure may provide a controller including a volatile memory, a data storage module configured to store user data input from an outside in the volatile memory, and a program control module configured to, if an execution command is input in a state where a size of the user data stored in the volatile memory is smaller than a unit program size, control an operation of programming final data obtained by adding at least one of a plurality of meta data to the user data into an externally located non-volatile memory.

In another aspect, embodiments of the disclosure may provide a controller operation method including storing user data input from an outside in a first memory, receiving an execution command in a state where a size of the user data stored in the first memory is smaller than a unit program size, comparing a difference between the unit program size and the size of the user data with a size of at least one of a plurality of meta data, and selecting at least a part of at least one of the plurality of meta data, and programming final data obtained by adding the selected meta data to the user data in a second memory.

According to embodiment of the present disclosure, the user data or data to which meta data is added to user data may be programmed into a memory according to a preset unit program size, accordingly, it is possible to improve the efficiency of program operation by a controller.

DETAILED DESCRIPTION

Figure 1:
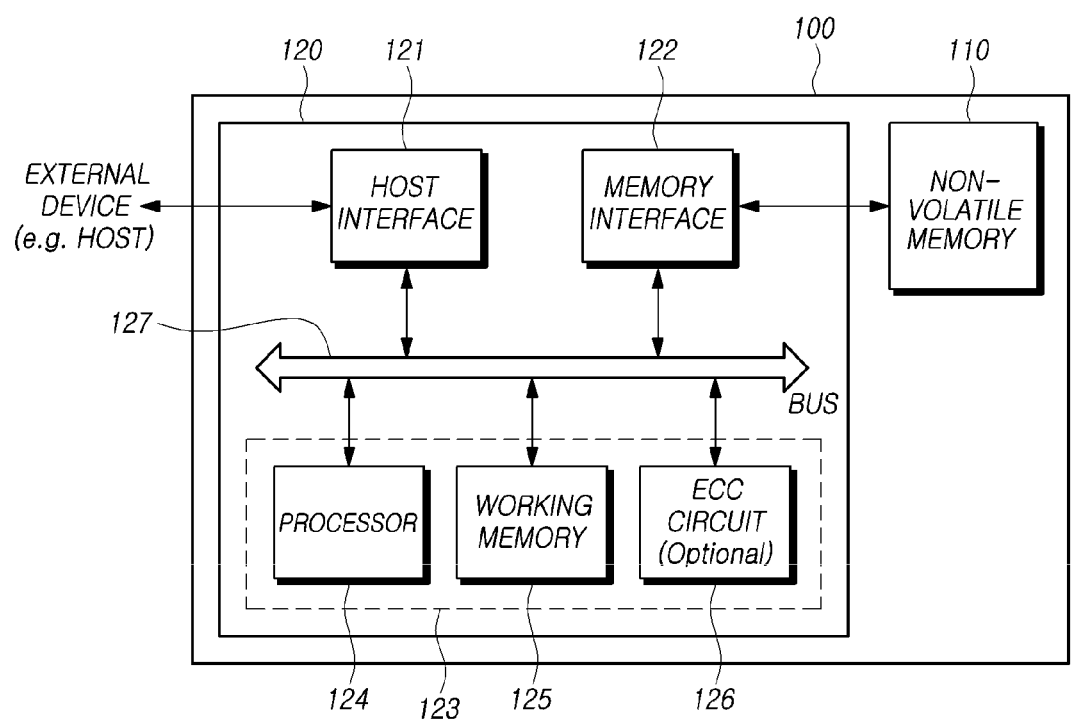
FIG. 1 is a schematic diagram illustrating a configuration of a storage device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, or manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a schematic diagram illustrating a configuration of a storage device 100 according to embodiments of the present disclosure.

The storage device 100 may include a non-volatile memory 110 for storing data, and a controller 120 for controlling the non-volatile memory 110.

The non-volatile memory 110 may include a plurality of memory blocks and may operate in response to control of the controller 120. An operation of the non-volatile memory 110 may include, for example, a read operation, a program operation (also referred to as a "write operation"), and an erase operation.

The non-volatile memory 110 may include a memory cell array including a plurality of memory cells (also referred to simply as "cells") storing data. Such a memory cell array may exist in a memory block.

For example, the non-volatile memory 110 may be implemented in a variety of types of a NAND flash memory, a 3D NAND flash memory, a NOR flash memory, a resistive RAM, a phase change memory, a magneto-resistive memory, a ferroelectric memory, or a spin injection magnetization inversion memory.

The non-volatile memory 110 may be implemented in a three-dimensional array structure. Embodiments of the present disclosure may be applied not only to a flash memory in which a charge storage layer is composed of a conductive floating gate, but also to a flash memory of a charge trap type in which a charge storage layer is composed of an insulating film.

The non-volatile memory 110 may receive a command and an address from the controller 120 and access an area selected by the address in the memory cell array. The non-volatile memory 110 may perform an operation indicated by a command on an area selected by an address.

For example, the non-volatile memory 110 may perform a program operation, a read operation, and an erase operation.

When performing a program operation, the non-volatile memory 110 may program data in an area selected by an address. When performing a read operation, the non-volatile memory 110 may read data from an area selected by an address. When performing the erase operation, the non-volatile memory 110 may erase data stored in an area selected by an address.

The controller 120 may control write (program), read, erase, and background operations of the non-volatile memory 110. The background operations may include, for example, one or more of garbage collection (GC), wear leveling (WL), read reclaim (RR), or bad block management (BBM) operations.

The controller 120 may control the operation of the non-volatile memory 110 according to a request of a device (e.g., a host HOST) located outside the storage device 100. In addition, the controller 120 may control the operation of the non-volatile memory 110 regardless of a request from the host HOST.

The host may be a computer, UMPC (Ultra Mobile PC), workstation, PDA (Personal Digital Assistants), tablet, mobile phone, smartphone, e-book, PMP (Portable Multimedia Player), portable game device, a navigation device, a black box, a digital camera, a DMB (Digital Multimedia Broadcasting) players, smart televisions, digital voice recorders, digital voice players, digital video recorders, digital video players, digital video recorders, digital video players, storage constituting data centers, one of various electronic devices constituting a home network, one of various electronic devices constituting a computer network, one of various electronic devices constituting a telematics network, an RFID (Radio Frequency IDentification) device, and a mobile device (e.g., a vehicle, a robot, a drone) capable of driving under human control or autonomous driving.

The host may include at least one operating system. The operating system may manage and control overall functions and operations of the host and provide mutual operations between the host and the storage device 100. The operating system may be divided into a general operating system and a mobile operating system depending on the mobility of the host.

The controller 120 and the host may be separate devices. In some cases, the controller 120 and the host may be implemented as an integrated device. In the following, for convenience of explanation, an example will be described in which the controller 120 and the host are separate devices.

Referring to FIG. 1, the controller 120 may include a memory interface 122, a control circuit 123, and the like, and may further include a host interface 121.

The host interface 121 provides an interface for communication with the host. For example, the host interface 121 may provide an interface using at least one of an universal serial bus (USB) protocol, a multimedia card (MMC) protocol, a peripheral component interconnection (PCI) protocol, a PCI-express (PCI-E) protocol, and an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, and a private protocol.

When receiving a command from the host, the control circuit 123 may receive the command through the host interface 121 and perform an operation of processing the received command.

The memory interface 122 may be connected to the non-volatile memory 110 to provide an interface for communication with the non-volatile memory 110.

The memory interface 122 may be configured to provide an interface between the non-volatile memory 110 and the controller 120 in response to control of the control circuit 123.

The control circuit 123 may control the operation of the non-volatile memory 110 by performing overall control operations of the controller 120. For example, the control circuit 123 may include one or more of a processor 124, a working memory 125, and the like, and may optionally include an error detection and correction circuit (ECC Circuit, 126) and the like.

The processor 124 may control overall operations of the controller 120 and perform logical operations. The processor 124 may communicate with the host through the host interface 121 and may communicate with the non-volatile memory 110 through the memory interface 122.

The processor 124 may perform a function of a flash translation layer (FTL). The processor 124 may convert a logical block address (LBA) provided by the host into a physical block address (PBA) through a flash translation layer (FTL). The flash translation layer (FTL) may receive a logical block address (LBA) by using a mapping table and convert it into a physical block address (PBA).

There are various algorithms for the address mapping of the flash translation layer according to mapping units. The address mapping algorithms may include a page mapping algorithm, a block mapping algorithm, and a mixed mapping algorithm.

The processor 124 may randomize data received from the host. For example, the processor 124 may randomize data received from the host using a set randomizing seed. The randomized data may be provided to the non-volatile memory 110 and programmed into a memory cell array of the non-volatile memory 110.

The processor 124 may derandomize data received from the non-volatile memory 110 during a read operation. For example, the processor 124 may derandomize data received from the non-volatile memory 110 using the derandomizing seed. The derandomized data may be output to the host.

The processor 124 may control the operation of the controller 120 by executing firmware. The processor 124 may execute (drive) firmware loaded into the working memory 125 during booting in order to control the overall operation of the controller 120 and perform logical operations. Hereinafter, an operation of the storage device 100 described in embodiments of the present disclosure may be implemented in a manner in which the processor 124 executes firmware defining corresponding operation.

The firmware may be a program executed in the storage device 100 to drive the storage device 100, and may include various functional layers. For example, the firmware may include binary data defining codes for executing each of the aforementioned functional layers.

For example, the firmware may include at least one of a flash translation layer (FTL) for performing a conversion function between a logical address requested by the host to the storage device 100 and a physical address of the non-volatile memory 110, a host interface layer (HIL) for interpreting a command requested by the host to the storage device 100 and delivering it to a flash translation layer (FTL), and a flash interface layer (FIL) for transferring commands instructed by the flash translation layer (FTL) to the non-volatile memory 110.

Such firmware, for example, may be loaded into the working memory 125 from the non-volatile memory 110 or from a separate non-volatile memory (e.g., ROM, or NOR Flash) located outside the non-volatile memory 110. When executing a booting operation after power-on, the processor 124 may first load all or part of the firmware into the working memory 125.

The processor 124 may perform logic operations defined in firmware loaded in the working memory 125 to control the overall operation of the controller 120. The processor 124 may store a result of performing a logic operation defined in firmware in the working memory 125. The processor 124 may control the controller 120 to generate a command or signal according to a result of performing a logic operation defined in firmware. If the part of the firmware defining the logic operation to be performed is not loaded in the working memory 125, there may create the event (e.g., interrupt) for loading the corresponding part of the firmware into the working memory 125.

Meanwhile, the processor 124 may load meta data necessary for driving the firmware from the non-volatile memory 110. Meta data is data for managing the non-volatile memory 110 and may include management information about user data stored in the non-volatile memory 110.

Meanwhile, the firmware may be updated while the storage device 100 is being produced or while the storage device 100 is running. The controller 120 may download new firmware from the outside of the storage device 100 and update the existing firmware to the new firmware.

The working memory 125 may store firmware, program codes, commands, or data required to operate the controller 120. The working memory 125, as a volatile memory, may include, for example, one or more of static RAM (SRAM), dynamic RAM (DRAM), and synchronous DRAM (SDRAM).

The error detection and correction circuit 126 may detect an error bit of target data using an error correction code and correct the detected error bit. The target data may be, for example, data stored in the working memory 125 or data read from the non-volatile memory 110.

The error detection and correction circuit 126 may be implemented to decode data with an error correction code. The error detection and correction circuit 126 may be implemented with a variety of code decoders. For example, a decoder performing non-systematic code decoding or a decoder performing systematic code decoding may be used.

For example, the error detection and correction circuit 126 may detect an error bit in units of sectors set for each of the read data. Each read data may be composed of a plurality of sectors. A sector may refer to a data unit smaller than a page, which is a read unit of a flash memory. Sectors constituting each read data may correspond to each other by using an address.

The error detection and correction circuit 126 may calculate a bit error rate (BER) and determine the possibility of correction in units of sectors. For example, the error detection and correction circuit 126 may determine that the corresponding sector is uncorrectable or failed if the bit error rate is higher than a set reference value. On the other hand, if the bit error rate is lower than the reference value, the corresponding sector may be determined to be correctable or pass.

The error detection and correction circuit 126 may sequentially perform error detection and correction operations on all read data. If a sector included in read data is correctable, the error detection and correction circuit 126 may skip an error detection and correction operation for a corresponding sector for next read data. If the error detection and correction operations for all read data are completed in this way, the error detection and correction circuit 126 may detect sectors determined to be uncorrectable until the end. The number of sectors determined to be uncorrectable may be one or more. The error detection and correction circuit 126 may transfer information (e.g., address information) on a sector determined to be uncorrectable to the processor 124.

A bus 127 may be configured to provide a channel between components 121, 122, 124, 125, and 126 of controller 120. The bus 127 may include, for example, a control bus for transferring various control signals, commands, and the like, and a data bus for transferring various data.

Meanwhile, some of the above-described components 121, 122, 124, 125, and 126 of the controller 120 may be deleted, or some of the above-described components 121, 122, 124, 125 and 126 may be integrated into one element. In some cases, one or more other components may be added in addition to the above-described components of the controller 120.

As described above, the controller 120 may control the operation of the non-volatile memory 110 according to a command input from the outside, and control to program user data input from the outside into the non-volatile memory 110.

The controller 120 may collect user data input from the outside until the user data has a certain size for the efficiency of program operation, and then, when the user data reaches the certain size, may control an operation of programming user data collected in the certain size into the non-volatile memory 110.

Figure 2:
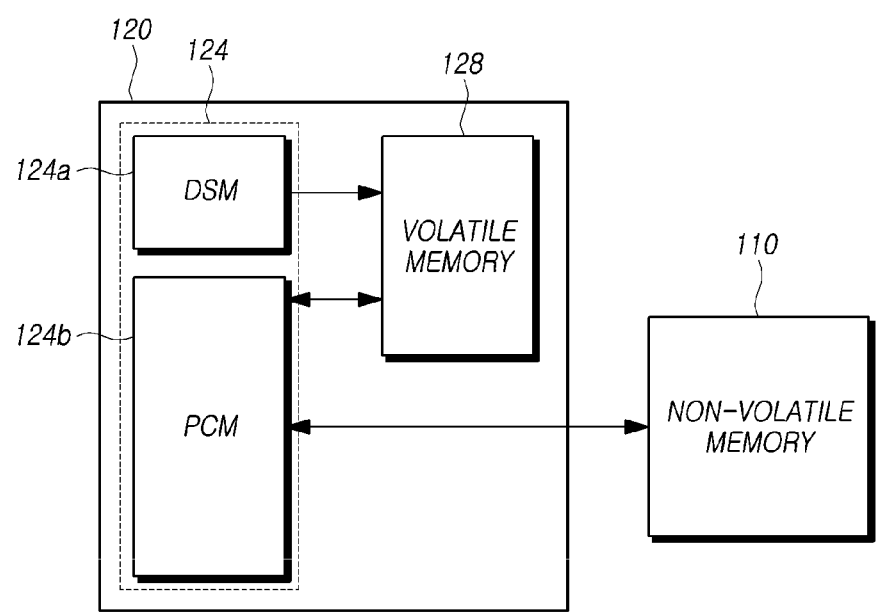
FIG. 2 illustrates an example of a processor included in a controller of a storage device according to embodiments of the present disclosure.

FIG. 2 illustrates an example of a processor 124 included in a controller 120 of a storage device 100 according to embodiments of the present disclosure.

Referring to FIG. 2, the controller 120 of the storage device 100 according to the embodiments may include a processor 124 and a volatile memory 128.

The volatile memory 128 may be the above-described working memory 125 or may be a memory disposed separately from the working memory 125. In some embodiments, the volatile memory 128 may be a memory disposed outside the controller 120.

The processor 124 may include, for example, a data storage module 124a and a program control module 124b. In some cases, the data storage module 124a and the program control module 124b may be integrally implemented.

For example, the data storage module 124a may receive a command from an external device such as a host HOST through the host interface 121.

In addition, the data storage module 124a may receive user data to be programmed into the non-volatile memory 110 from the host through the host interface 121.

When the user data to be programmed in the non-volatile memory 110 is input from the host, the data storage module 124a may store the input user data in the volatile memory 128. The size of user data input from the host may vary, and the user data input from the host may be sequentially stored in the volatile memory 128. In the description below, unless otherwise indicated, "user data" refers to user data received from outside the storage device 100 that is to be programmed into the non-volatile memory 110.

The program control module 124b may compare the size of user data stored in the volatile memory 128 with a preset unit program size.

The preset unit program size may be a size in which the program control module 124b programs user data in the non-volatile memory 110 as a unit. The unit program size may be, for example, a size corresponding to size of a page in the non-volatile memory 110, a size corresponding to a specific number of planes included in the non-volatile memory 110, or both, but is not limited thereto.

When it is confirmed that the size of the user data stored in the volatile memory 128 has reached or exceeded the preset unit program size, the program control module 124b may perform an operation of programming user data stored in the volatile memory 128 into the non-volatile memory 110. A function in which the program control module 124b collects user data having a size corresponding to a preset unit program size and performs a program operation on the non-volatile memory 110 may be referred to as a one-shot program.

The program control module 124b may program some or all of the user data stored in the volatile memory 128 into the non-volatile memory 110, and then delete the user data that was programmed from the volatile memory 128. The data storage module 124a may sequentially store user data input from the host in the volatile memory 128.

In some cases, there may be input an execution command (e.g., flush, barrier command) from the host before the size of user data stored in the volatile memory 128 reaches the preset unit program size.

If an execution command is input before the size of the user data stored in the volatile memory 128 reaches the preset unit program size, the program control module 124b may program, for example, data obtained by concatenating dummy data to user data stored in the volatile memory 128 into the non-volatile memory 110. The size of the data obtained by concatenating (sometimes referred to as "adding") dummy data to user data may be the same as the unit program size.

The dummy data may be data created based on user data. Since dummy data is concatenated to user data, data corresponding to the unit program size may be programmed into the non-volatile memory 110.

In embodiments, the program control module 124b may program data obtained by concatenating at least one of a plurality of meta data to user data stored in the volatile memory 128 into the non-volatile memory 110.

The plurality of meta data may be management information of user data stored in the non-volatile memory 110 or data for managing the non-volatile memory 110. The plurality of meta data may be, for example, log data, map data, Self-Monitoring, Analysis and Reporting Technology (SMART) data, and the like, but is not limited thereto.

If an execution command is input in a state where the size of user data stored in the volatile memory 128 is smaller than the preset unit program size, the program control module 124b may compare a difference between the size of user data and the unit program size with the size of each of a plurality of meta data.

For example, the program control module 124b may compare the size of meta data having the largest size among a plurality of meta data with the difference between the size of user data and the unit program size.

The program control module 124b may concatenate corresponding meta data to user data if the size of the meta data having the largest size is smaller than the difference between the size of the user data and the unit program size.

Subsequently, the program control module 124b may compare a value obtained by subtracting the size of user data and concatenated meta data from a unit program size with the size of remaining meta data among the plurality of meta data, and select more meta data to be additionally concatenated to the user data.

If the size of the meta data having the largest size is greater than the difference between the size of the user data and the unit program size, the program control module 124b may compare the size of meta data having the second largest size among the plurality of meta data with the difference between the size of user data and the unit program size.

The program control module 124b may select at least one meta data to be concatenated to the user data by sequentially comparing the difference between the size of the user data and the unit program size with the size of each of the plurality of meta data, starting from meta data having a largest size.

In another embodiment, the program control module 124b may select meta data to be concatenated to the user data according to preset priorities.

In embodiments, priority may be set according to the respective importance of the meta data, according to respective update times of the meta data, or a combination thereof. For example, meta data with the oldest update time among the meta data that has been updated may be assigned the highest priority.

In embodiments that select meta data according to priority, the program control module 124b may compare the size of the meta data with the difference between the size of the user data and the unit program size in an order based on the priority of the meta data rather than in order of the size of the meta data, and may select meta data to concatenate to the user data accordingly.

The program control module 124b may control an operation of programming final data obtained by concatenating one or more meta data having a collective size corresponding to the difference between the size of user data and the unit program size to the user data into the non-volatile memory 110.

In some cases, the program control module 124b may control an operation of programming final data obtained by concatenating meta data and dummy data to user data into the non-volatile memory 110. For example, in a case wherein meta data is concatenated to user data and the size of the remaining portion (that is, the difference between the unit program size and the size of the user data and the concatenated meta data) does not correspond to the size of other (un-added) meta data, there may be performed a program operation on the final data to which dummy data is concatenated to the remaining portion.

Since the program control module 124b controls the operation of programming the final data having a size equal to the unit program size into the non-volatile memory 110 by concatenating meta data to the user data, the operation of programming data into the non-volatile memory 110 can be smoothly performed even if an execution command is generated before sufficient user data to perform a program operation of the unit program size is stored in the volatile memory 128.

In addition, since a program operation is performed in the non-volatile memory 110 by concatenating meta data to user data, it is possible to improve the efficiency of program operations performed by the controller 120 by reducing an occurrence of separate operations of programming meta data into the non-volatile memory 110.

FIGS. 3 to 6 are diagrams illustrating examples of a process of programming user data in a non-volatile memory 10 by a controller 120 of a storage device 100 according to embodiments of the present disclosure.

Figure 3:
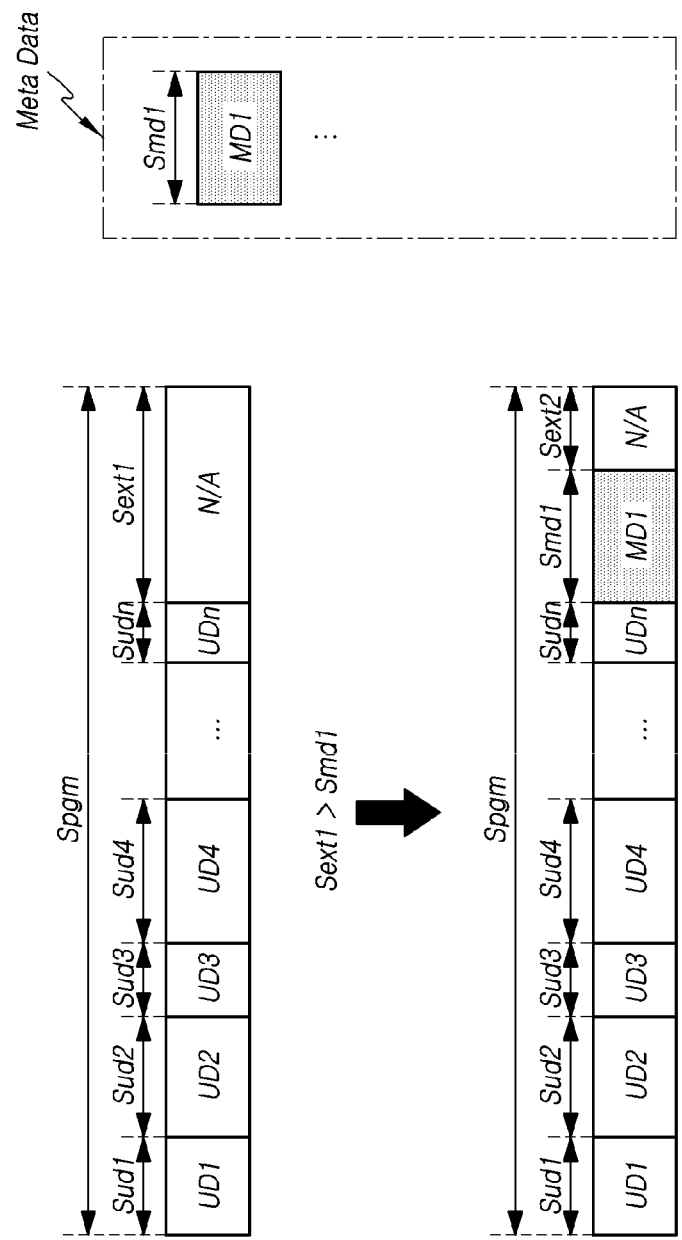
FIGS. 3 to 6 are diagrams illustrating examples of processes of programming user data in a non-volatile memory by a controller of a storage device according to embodiments of the present disclosure.

FIG. 3 illustrates a case in which n pieces of user data (UD1, UD2, . . . , UDn) are stored in the volatile memory 128 as an example.

The respective sizes of the n pieces of user data (UD1, UD2, . . . , UDn) stored in the volatile memory 128 may be Sud1, Sud2, . . . , Sudn. The sum of the sizes of the n pieces of user data UD1, UD2, . . . , UDn may be smaller than the unit program size Spgm. The difference between the sum of the sizes of n pieces of user data UD1, UD2, . . . , UDn and the unit program size Spgm may be Sext1.

If an execution command is input in a state where the sum of the sizes of user data stored in the volatile memory 128 is smaller than the unit program size Spgm, the program control module 124b may compare Sext1, which is the difference between the sum of the user data sizes and the unit program size Spgm, with the respective sizes of a plurality of meta data.

For example, the program control module 124b may compare the size Smd1 of first meta data MD1 having the largest size among the plurality of meta data with Sext1, which is the difference between the size of the user data and the unit program size Spgm.

If Smd1 is smaller than Sext1, the program control module 124b may concatenate first meta data MD1 to the user data.

Since the first meta data MD1 is concatenated to the user data, the size of the portion remaining in the unit program size Spgm may be Sext2, which may equal Spgm minus Smd1.

The program control module 124b may compare the size Sext2 of the portion remaining after the first meta data MD1 is concatenated to the user data with the size of meta data other than the first meta data MD1.

Figure 4:
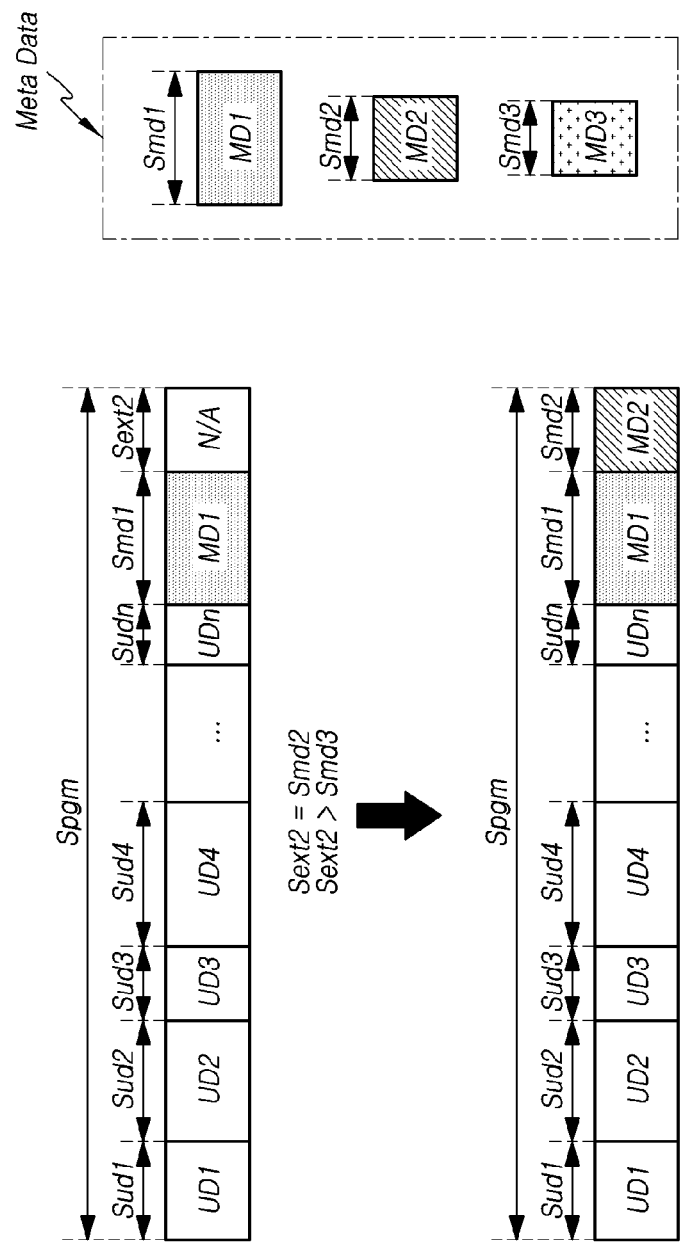

Referring to FIG. 4, the program control module 124b may compare the difference between the sum of the size of user data and the size of the first meta data MD1 and the unit program size Spgm with the sizes of meta data other than the first meta data MD1.

For example, the program control module 124b may compare the size Smd2 of second meta data MD2 which is the second largest among a plurality of meta data, with Sext2, which is a value obtained by subtracting the size of user data and the size Smd1 of the first meta data MD1 from the unit program size Spgm.

For example, the size Smd2 of the second meta data MD2 may be equal to a value obtained by subtracting the size Smd1 of the first meta data MD1 and the size of the user data from the unit program size Spgm.

Since a size Smd3 of a third meta data MD3 is smaller than the size Smd2 of the second meta data MD2, the size Smd3 of the third meta data MD3 may be smaller than a value obtained by subtracting the size of the user data and the size Smd1 of the first meta data MD1 from the unit program size Spgm.

The program control module 124b may concatenate second meta data MD2 to the data in which the first meta data MD1 has been concatenated to the user data.

The final data including user data, first meta data MD1 and second meta data MD2 may be programmed into the non-volatile memory 110 by the program control module 124b.

The programming of the final data corresponding to the unit program size Spgm is performed by the program control module 124b, and meta data can be stored in the non-volatile memory 110 through the remaining portion (after storing the user data) of the unit program size Spgm. Accordingly, it is possible to improve the efficiency of program operations by the program control module 124b.

If the size Smd2 of the second meta data MD2 is greater than the difference between the unit program size Spgm and the sum of the size of the user data size and the size Smd1 of the first meta data MD1, the program control module 124b may compare the size of meta data other than the second meta data MD2 with the size Sext2 of the remaining portion.

Figure 5A:
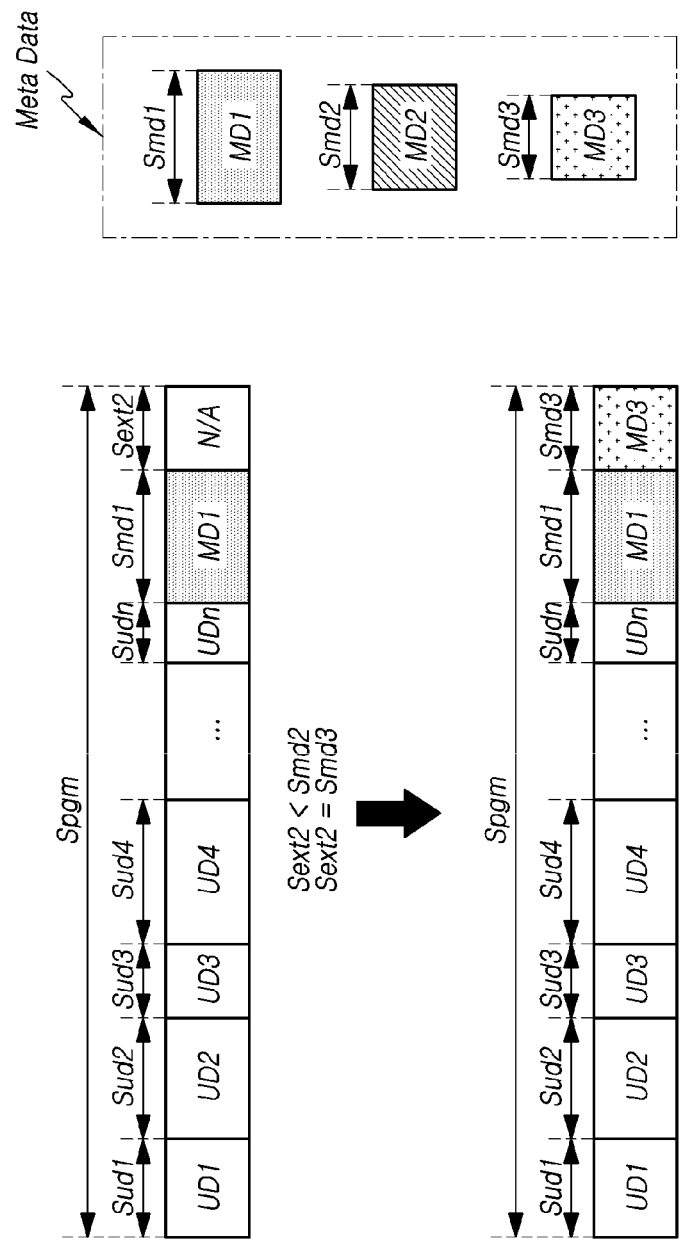

For example, referring to FIG. 5A, the program control module 124b may compare the size Smd3 of the third meta data MD3 having the third largest size with Sext2 corresponding to the difference between the unit program size Spgm and the sum of the size of user data and the size Smd1 of the first meta data MD1.

The program control module 124b may concatenate the third meta data MD3 to the user data if the size Smd3 of the third meta data MD3 is equal to or less than the size Sext2 of the remaining portion.

As shown in the example of FIG. 5A, the size Smd3 of the third meta data MD3 may be equal to the size Sext2 of the remaining portion. In this case, the first meta data MD1 and third meta data MD3 may be concatenated to the user data.

The program control module 124b may then program final data obtained by concatenating the first meta data MD1 and the third meta data MD3 to the user data into the non-volatile memory 110.

In the embodiment described above, the program control module 124b may select meta data to be concatenated to the user data based on the size of the plurality of meta data.

In another embodiment, the program control module 124b may select meta data to be concatenated to the user data based on the size and priority of each of a plurality of meta data.

Figure 5B:
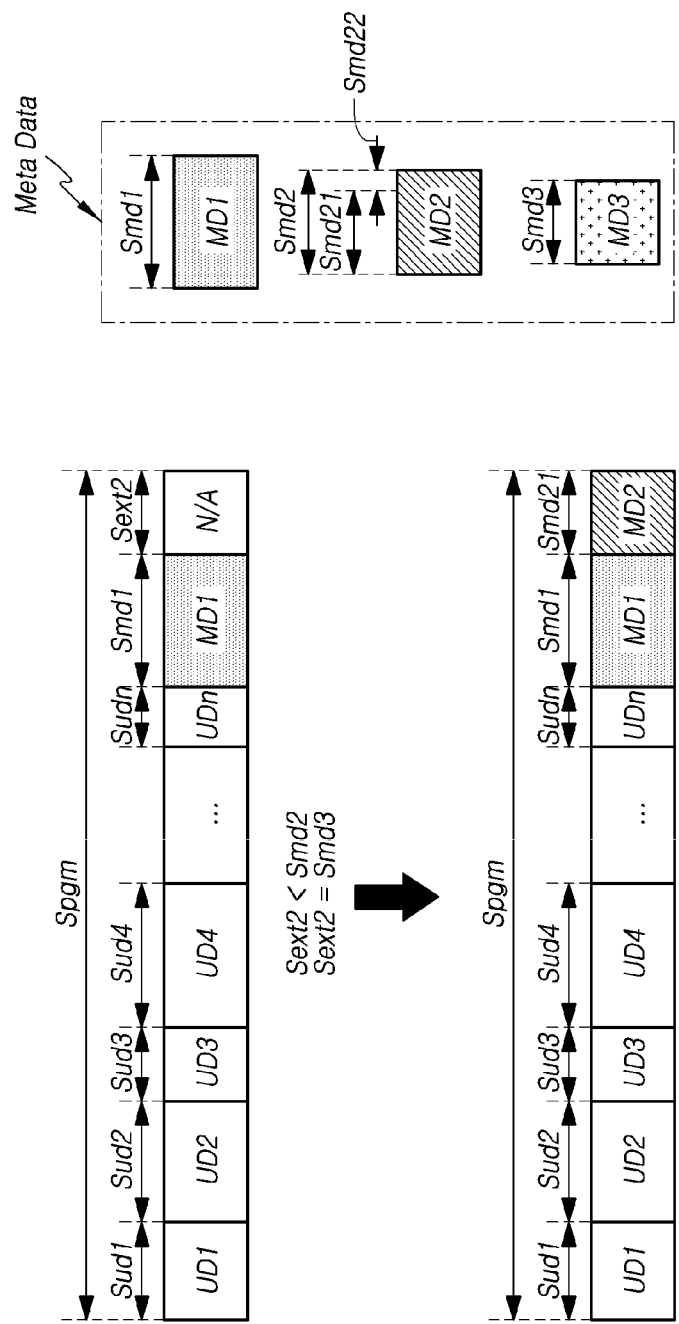

Referring to FIG. 5B, Sext2, which is a value obtained by subtracting the size of the user data and the size Smd1 of the first meta data MD1 from the unit program size Spgm, may be smaller than the size Smd2 of the second meta data MD2 and larger than the size Smd3 of the third meta data MD3.

The program control module 124b may concatenate a part of the second meta data MD2 to the user data. The size Smd21 of the part of the second meta data MD2 may be, for example, the same as the size Sext2 of the remaining portion.

The program control module 124b may concatenate a part of the second meta data MD2 corresponding to the size Sext2 of the remaining portion excluding the size of the user data and the concatenated meta data from the unit program size Spgm to the user data.

The part of the second meta data MD2 concatenated to the user data may correspond to a part having a higher priority among the second meta data MD2.

For example, in the case that the second meta data MD2 is map data, the updated map data in the map data may be selected as a part of the second meta data MD2 to be concatenated to the user data.

In this case, map data having the oldest update time may have the highest priority. Map data with the oldest update time may be sequentially selected to correspond to the size Sext2 of the remaining portion.

As in the above example, in embodiments, the program control module 124b may select meta data having a size corresponding to a portion remaining after excluding the size of pre-stored user data from the unit program size Spgm. In other embodiments, the program control module 124b may select meta data having a size corresponding to the portion remaining in the unit program size Spgm from meta data (or portions of meta data) having a high priority among a plurality of meta data.

Since the program control module 124b adds meta data selected based on the size or priority of the meta data to the part excluding user data from the unit program size Spgm, the final data having the unit program size and including user data and meta data may be programmed into the non-volatile memory 110.

Therefore, it is possible to improve the program operation efficiency of the controller 120, and provide an advantage of reducing program operations of meta data.

In addition, in some cases, if a remaining portion occurs after concatenating meta data to the user data, a program operation may be performed by adding dummy data to the corresponding portion.

For example, if the difference between the unit program size and the sum of the size of the user data and the size Smd1 of the first meta data MD1 is smaller than the minimum size of each of the other meta data in the plurality of meta data, the controller 120 may program the final data obtained by concatenating the first meta data MD1 and dummy data to the user data into the non-volatile memory 110.

Figure 6:
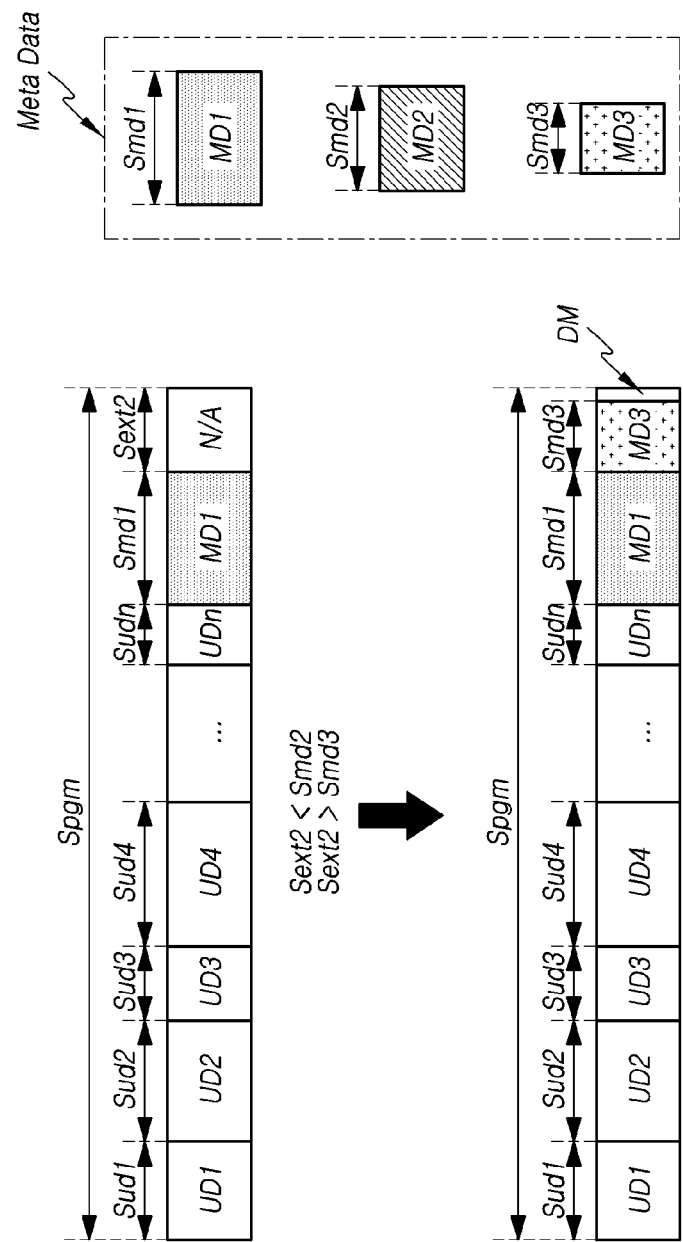

Referring to FIG. 6, first meta data MD1 may be concatenated to the user data according to a difference between the size of the user data stored in the volatile memory 128 and the unit program size Spgm.

A value obtained by subtracting the size of the user data and the size Smd1 of the first meta data MD1 from the unit program size Spgm may be Sext2.

The program control module 124b may sequentially compare the size Sext2 of the remaining portion of the unit program size Spgm with the size Smd2 of the second meta data MD2 and the size Smd3 of the third meta data MD3.

The size Smd2 of the second meta data MD2 may be larger than the size Sext2 of the remaining portion, and the size Smd3 of the third meta data MD3 may be smaller than the size Sext2 of the remaining portion.

In an embodiment, the program control module 124b may concatenate a part of the second meta data MD2 to the user data based on the priority of that part, as in the above example. In another embodiment, the program control module 124b may concatenate third meta data MD3 having a size smaller than Sext2, which is the size of the remaining portion in the unit program size Spgm, to the user data based on the size of the meta data.

Since the third meta data MD3 having a size Smd3 smaller than the size Sext2 of the remaining portion is concatenated to the user data, the sum of the size of the user data, the size Smd1 of the first meta data MD1, and the size Smd3 of the third meta data MD3 may be smaller than the unit program size Spgm.

In such a case, the program control module 124b may add dummy data DM to a remaining portion of the unit program size Spgm in order to program final data corresponding to the unit program size Spgm in the non-volatile memory 110. The program control module 124b may generate the final data obtained by combining the user data, first meta data MD1, third meta data MD3, and dummy data, and may perform an operation of programming the final data into the non-volatile memory 110.

Since in this example the program control module 124b performs a program operation by concatenating the first meta data MD1 and the third meta data MD3 to the user data, the efficiency of the program operation can be improved. In addition, in the case that the size of the remaining portion of the unit program size Spgm is not suitable for concatenating meta data, dummy data DM may be concatenated to match the unit program size Spgm, so that the one-shot program by the program control module 124b may be appropriately performed.

Figure 7A:
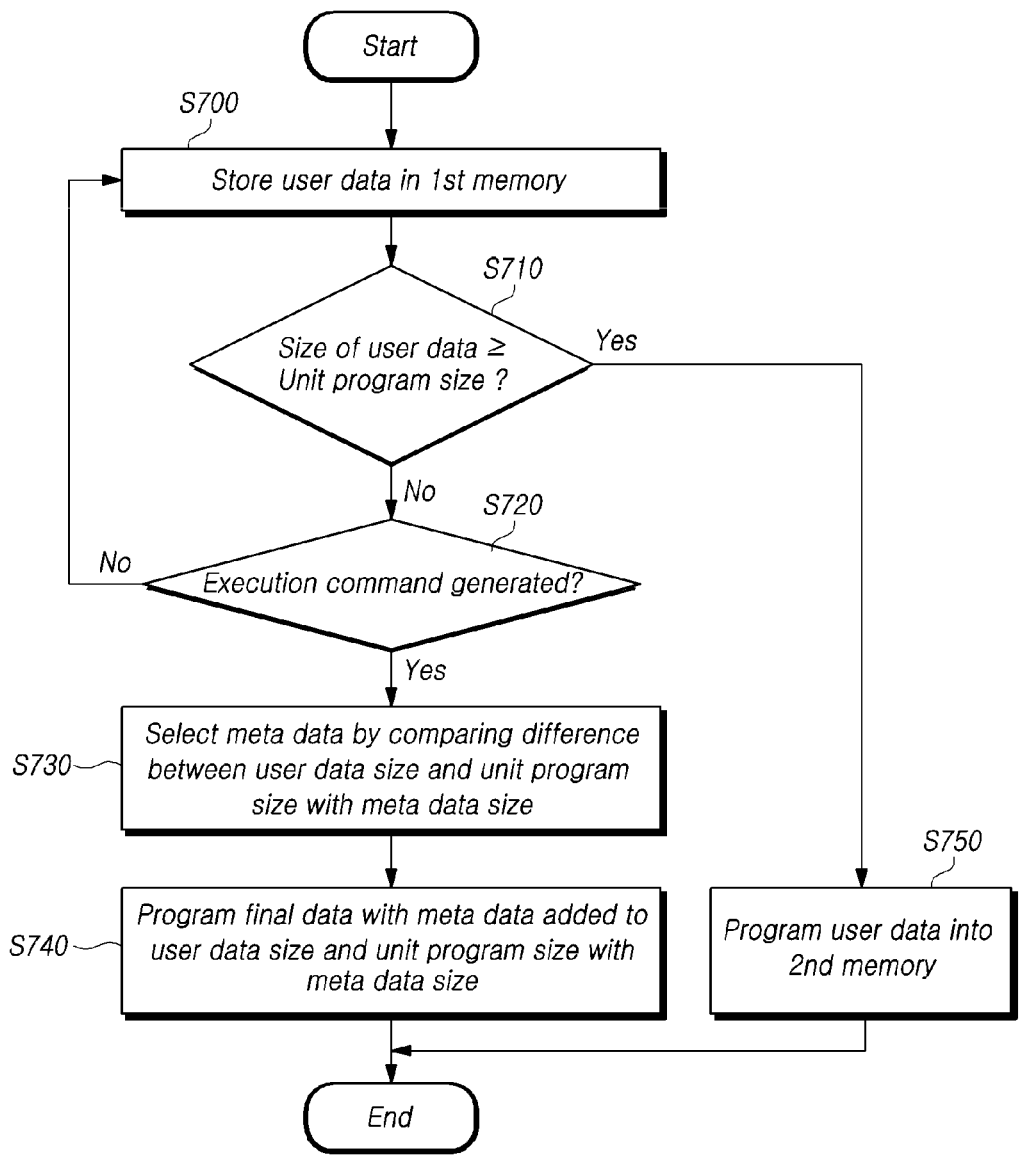
FIGS. 7A and 7B are flowcharts illustrating an example of a controller operation process according to embodiments of the present disclosure.
Figure 7B:
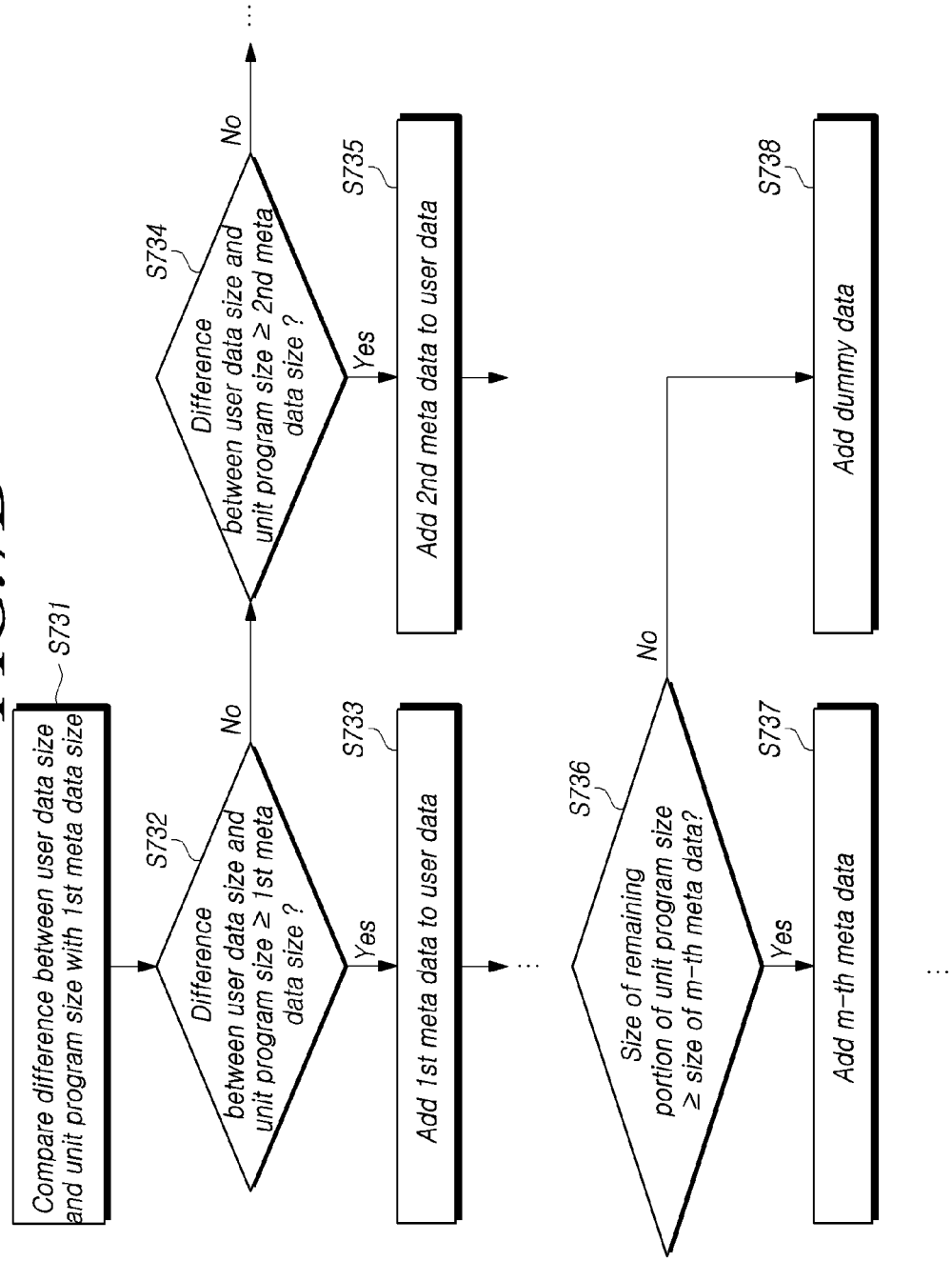

FIGS. 7A and 7B are flowcharts illustrating an example of an operation process of the controller 120 according to embodiments of the present disclosure.

Referring to FIGS. 7A and 7B, when user data is received from an external device such as a host, the controller 120 may store the user data in a first memory (S700).

The first memory may be, for example, a volatile memory. The first memory may be, for example, a memory disposed in the controller 120. In some cases, the first memory may be a memory disposed outside the controller 120.

The controller 120 may check whether the size of the user data stored in the first memory is greater than or equal to a unit program size (S710).

When the size of the user data stored in the first memory is greater than or equal to the unit program size, the controller 120 may perform an operation of programming all or a portion of the user data stored in the first memory and corresponding to the unit program size into a second memory. (S750). The portion of the user data programmed into the second memory may then be deleted from the first memory.

The second memory may be, for example, a non-volatile memory. The second memory may be a memory disposed outside the controller 120.

When the size of user data stored in the first memory is smaller than the unit program size, the controller 120 may check whether an execution command, such as a flush command or a barrier command, has been generated (S720).

The controller 120 may return to S700 to repeatedly perform an operation of storing user data received from the outside in the first memory when an execution command has not been generated.

The controller 120 may perform an operation of selecting meta data to be concatenated to the user data when an execution command has been generated in a state wherein the size of user data is smaller than the unit program size.

For example, the controller 120 may select meta data to be concatenated to the user data by comparing a difference between the size of the user data and the unit program size with the size of the meta data (S730).

FIG. 7B illustrates a process of selecting one or more meta data to concatenate to the user data such as may be performed in S730 of FIG. 7A according to an embodiment. As shown in FIG. 7B, the controller 120 may compare the difference between the size of user data and the unit program size with the size of first meta data having the largest size among a one or more meta data (S731).

If the difference between the size of the user data and the unit program size is greater than or equal to the size of the first meta data (S732), the controller 120 may concatenate the first meta data to the user data (S733).

If the difference between the size of the user data and the unit program size is smaller than the size of the first meta data, the controller 120 may compare the size of the remaining portion of the unit program size with the size of second meta data having the second largest size among the one or more meta data (S734).

If the size of the second meta data is smaller than or equal to a value obtained by subtracting the size of the user data from the unit program size, the controller 120 may concatenate the second meta data to the user data (S735).

If the size of the second meta data is greater than the size of the remaining portion in the unit program size, the controller 120 may select meta data to be concatenated to the user data by sequentially comparing the size of the meta data having a smaller size than the second meta data with the size of remaining portion.

If the difference between the size of the user data and the unit program size is equal to or greater than the size of the first meta data and the first meta data is concatenated to the user data, the controller 120 may compare a value obtained by subtracting the size of the user data and the size of the concatenated meta data from the unit program size with the size of each of the remaining meta data according to the size order of the remaining meta data.

In this case, the size of the remaining portion of the unit program size may be a value obtained by subtracting the size of the user data and the size of the concatenated first meta data from the unit program size.

The controller 120 may select meta data to be concatenated to the user data according to a comparison result between the size of the remaining portion of the unit program size and the size of the remaining meta data other than the first meta data.

For example, the controller 120 may sequentially compare the difference between the unit program size and the sum of the size of the user data and the size of the concatenated meta data with the size of the remaining meta data in order of size.

In the case wherein the number of meta data is m, the controller 120 may finally compare the size of the remaining portion of the unit program size with the size of the m-th meta data (S736). If the size of the m-th meta data is equal to or less than the size of the remaining portion of the unit program size, the controller 120 may concatenate the m-th meta data to the user data (S737).

If the size of the m-th meta data is greater than the size of the remaining portion of the unit program size and the size of the remaining portion is not zero, the controller 120 may add dummy data to the corresponding portion since there is no meta data to be concatenated to the remaining portion (S738).

The controller 120 may perform an operation of programming the final data, which corresponds to the unit program size and which is produced by concatenating only meta data to the user data or concatenating meta data and dummy data to the user data, into the second memory (S740).

Accordingly, since the controller 120 selects meta data to be concatenated to the user data based on the size of the meta data and programs the final data obtained by concatenating the meta data to the user data, the efficient one-shot program may be performed even if sufficient user data for performing the one-shot program is not stored in the first memory.

In addition, in some cases, since the controller 120 selects meta data to be concatenated to user data based on the size of meta data or the priority of meta data, or adds only a part of meta data to user data, it is possible to improve the efficiency of a one-shot program performed by concatenating the meta data to the user data.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A method performed by a controller, the method comprising:
   storing user data in a first memory; and
   when the user data is to be programmed to a second memory and a size of the user data is smaller than a unit program size:

selecting one or more meta data from among a plurality of meta data by comparing respective sizes of the one or more meta data with a difference between the unit program size and the size of the user data and according to respective priorities of the plurality of meta data, producing final data by concatenating the user data and the one or more meta data, and programming the final data in the second memory, wherein selecting the one or more meta data includes selecting a portion of a first meta data among the plurality of meta data when a size of a second meta data of the plurality of meta data is less than a size of the first meta data and a priority of the first meta data is greater than a priority of the second meta data.

2. The method of claim 1, wherein producing the final data comprises concatenating the user data, the one or more meta data, and dummy data.

3. The method of claim 1, wherein the user data is to be programmed to a second memory in response to receiving an execution command.

4. A controller comprising:
a volatile memory;
a data storage module configured to store user data input from outside the controller in the volatile memory; and
a program control module configured to, when an execution command is input from a host device in a state that a size of the user data stored in the volatile memory is smaller than a unit program size:
  select one or more meta data from among a plurality of meta data according to a difference between the size of the user data and the unit program size, respective sizes of the plurality of meta data, and respective priorities of the plurality of meta data;
  produce final data by concatenating the user data and the one or more meta data, and control an operation of programming the final data into an externally located non-volatile memory,
wherein selecting the one or more meta data includes selecting a portion of a first meta data among the plurality of meta data when a size of a second meta data of the plurality of meta data is less than a size of the first meta data and a priority of the first meta data is greater than a priority of the second meta data.

5. The controller of claim 4, wherein program control module is further configured to select the one or more meta data from a plurality of meta data based on comparison results between respective sizes of the plurality of meta data and a difference between the unit program size and the size of the user data.

6. The controller of claim 4, wherein program control module is further configured to select the one or more meta data from a plurality of meta data based on an update time of the plurality of meta data.

7. A storage device comprising:
a non-volatile memory;
a volatile memory storing user data to be programmed into the non-volatile memory; and
a controller configured to, when an execution command is received from a host device in a state that a size of the user data stored in the volatile memory is smaller than a unit program size:
  select one or more meta data from among a plurality of meta data according to a difference between the size of the user data and the unit program size, respective sizes of the plurality of meta data, and respective priorities of the plurality of meta data;
  produce final data by concatenating the user data and the one or more meta data; and
  program the final data into the non-volatile memory,
wherein selecting the one or more meta data includes selecting a portion of a first meta data among the plurality of meta data when a size of a second meta data of the plurality of meta data is less than a size of the first meta data and a priority of the first meta data is greater than a priority of the second meta data.

8. The storage device of claim 7, wherein a sum of the size of the user data and a size of the one or more meta data is equal to or less than the unit program size.

9. The storage device of claim 7, wherein selecting the one or more meta data comprises;
  selecting the portion of the first meta data when the size of the second meta data is less than the size of the first meta data, the priority of the first meta data is greater than the priority of the second meta data, and the size of the first meta data is greater than a size of a remaining portion,
wherein the size of the remaining portion corresponds to a difference between the unit program size and a sum of the size of the user data and respective sizes of one or more already-selected meta data when there is one or more already-selected meta data, and corresponds to the difference between the unit program size and the size of the user data otherwise.

10. The storage device of claim 7, wherein the final data comprises the user data, the one or more meta data, and dummy data.

11. The storage device of claim 7, wherein the controller compares the difference between the unit program size and the size of the user data with the respective sizes of each of the plurality of meta data to determine the one or more meta data.

12. The storage device of claim 11, wherein the controller sequentially compares the difference between the unit program size and the size of the user data with the respective sizes of each of the plurality of meta data starting from the largest value among the sizes of each of the plurality of meta data.

13. The storage device of claim 7, wherein the controller is configured to determine the one or more meta data by:
  comparing a first size of a first meta data to a first difference between the unit program size and the size of the user data; and
  when the first difference is equal to or greater than the first size:
    including the first meta data in the one or more meta data;
  when a second size of a second meta data is less than or equal to the first size:
  comparing the second size to a second difference between the unit program size and the sum of the size of the user data and the first size, and
  when the second size is equal to or less than the second difference, including the second meta data in the one or more meta data.

14. The storage device of claim 13, wherein the controller is further configured to determine the one or more meta data by:
  when the second size is less than the second difference and a third size of a third meta data is less than or equal to the second size:
  comparing the third size to a third difference between the unit program size and the sum of the size of the user data, the first size, and the second size; and when the third size is equal to or less than the third difference, including the third meta data in the one or more meta data.

15. The storage device of claim 13, wherein the controller is further configured to determine the one or more meta data by:
when the second difference is smaller than the second size and a third size of a third meta data is less than the second size:
comparing the third size to the second difference, and
when the third size is equal to or less than the second difference, including the third meta data in the one or more meta data.

16. The storage device of claim 13, wherein the controller is configured to determine the one or more meta data by:
when the first difference is less the first size, including an other meta data having a size less than the first size in the one or more meta data.

17. The storage device of claim 7, wherein the controller is further configured to produce the final data by concatenating the user data, the one or more meta data, and dummy data when a sum of the size of the user data and a size of the one or more meta data is less than the unit program size.

18. The storage device of claim 7, wherein the controller is further configured to:
set the respective priorities for the plurality of meta data based on respective update times of the plurality of meta data.

19. The storage device of claim 7, wherein the one or more meta data comprises map data, log data, Self-Monitoring, Analysis and Reporting Technology (SMART) data, or combinations thereof.

20. The storage device of claim 7, wherein the one or more meta data includes update map data in which an update has occurred from among map data stored in the volatile memory.

* * * * *